(12) United States Patent
Norman

(10) Patent No.: US 9,798,947 B2
(45) Date of Patent: Oct. 24, 2017

(54) METHOD AND SYSTEM FOR SPLITTING SCHEDULING PROBLEMS INTO SUB-PROBLEMS

(71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 425 days.

(21) Appl. No.: 13/655,934

(22) Filed: Oct. 19, 2012

(65) Prior Publication Data

US 2014/0136252 A1     May 15, 2014

Related U.S. Application Data

(60) Provisional application No. 61/553,851, filed on Oct. 31, 2011.

(51) Int. Cl.
| | |
|---|---|
| *G06K 9/00* | (2006.01) |
| *G06K 9/34* | (2006.01) |
| *G06F 9/45* | (2006.01) |
| *G06K 9/46* | (2006.01) |
| *G06Q 10/06* | (2012.01) |

(Continued)

(52) U.S. Cl.
CPC ............. *G06K 9/34* (2013.01); *G06F 8/45* (2013.01); *G06K 9/4638* (2013.01); *G06Q 10/06311* (2013.01); *G06T 7/11* (2017.01); *G06T 7/12* (2017.01); *G06T 2207/10072* (2013.01); *H04L 47/10* (2013.01)

(58) Field of Classification Search
None
See application file for complete search history.

(56) References Cited

U.S. PATENT DOCUMENTS 6,112,023 A * 8/2000 Dave et al. .................. 703/27
6,490,566 B1   12/2002 Schmidt
(Continued)

FOREIGN PATENT DOCUMENTS

CN         102123075 A      7/2011

OTHER PUBLICATIONS

Rios-Mercado, Roger Z. et al., Computational Experience with a Branch-and-Cut Algorithm for Flowership Scheduling with Setups, University of Texas at Austin, May 1997.*

(Continued)

*Primary Examiner* — Gurkanwaljit Singh
(74) *Attorney, Agent, or Firm* — Lowenstein Sandler LLP

(57) ABSTRACT

A computing system receives user input of scheduling problem data. The scheduling problem data relates to a scheduling problem and includes one or more stations and tasks to be performed by at least one station. The computing system constructs a graph problem using the scheduling problem data. The graph problem includes a graph. The computing system cuts the graph into sub-graphs using a cut algorithm to create a cut result that satisfies a threshold and identifies one or more task exceptions from the sub-graphs in the cut result. The one or more task exceptions are tasks that can be assigned to more than one sub-graph. The computing system creates scheduling sub-problems pertaining to the one or more task exceptions using the cut result.

17 Claims, 7 Drawing Sheets

(51) Int. Cl.
*G06T 7/12* (2017.01)
*H04L 12/801* (2013.01)
*G06T 7/11* (2017.01)

(56) References Cited

U.S. PATENT DOCUMENTS

| | | | |
|---|---|---|---|
| 7,788,210 B2 | 8/2010 | Lang et al. | |
| 8,812,653 B2* | 8/2014 | Chandrasekaran | 709/224 |
| 2003/0065415 A1 | 4/2003 | Hegde et al. | |
| 2003/0167265 A1* | 9/2003 | Corynen | 707/4 |
| 2005/0137734 A1 | 6/2005 | Nieuwelaar et al. | |
| 2005/0278049 A1 | 12/2005 | Van Den Nieuwelaar et al. | |
| 2006/0291390 A1* | 12/2006 | Zhang et al. | 370/235 |
| 2008/0215409 A1 | 9/2008 | Van Matre | |
| 2008/0216077 A1 | 9/2008 | Emani et al. | |
| 2008/0218518 A1* | 9/2008 | Zhou et al. | 345/440 |
| 2008/0276136 A1 | 11/2008 | Lin et al. | |
| 2009/0047677 A1* | 2/2009 | Frasch et al. | 435/6 |
| 2009/0106184 A1 | 4/2009 | Lang et al. | |
| 2009/0313596 A1* | 12/2009 | Lippmann et al. | 716/12 |
| 2011/0029982 A1* | 2/2011 | Zhang et al. | 718/105 |
| 2011/0313984 A1* | 12/2011 | Zhou et al. | 707/704 |

OTHER PUBLICATIONS

Ji, Xiaoyun, Graph Partition Problems with Minumum Size Constraints Renssler Polytechnic Institute, Nov. 2004.*

Schlogel, Kirk Andrew, Graph Partitioning for Emerging Scientific Simulations University of Minnesota, Nov. 1999.*

Mohring, Rolf H. et al., Solving Project Scheduling Problems by Minimum Cut Comparisons Management Science, vol. 29, No. 3, Mar. 2003.*

Lu, Yufeng, Scheduling of Wafer Test Processes in Semiconductor Manufacturing Virginia Polytechnic Institute and State University, Oct. 26, 2001.*

Stecco, Gabriella et al., A branch-and-cut algorithm for a production scheduling problem with sequence-dependent and time-dependent setup times, Computers & Operations Research, vol. 35, 2008.*

Pacciarelli, Dario, Parallel machine scheduling in a flexible manufacturing system INFOR, vol. 29, No. 2, May 2001.*

Junger, Michael et al., Introduction to ABACUS—a branch-and-cut system Operations Research Letters, vol. 22, 1998.*

Ascheuer, N. et al., A Cutting Plane Approach to the Sequential Ordering Problem (With Applications to Job Scheduling in Manufacturing), SIAM J. Optimization, vol. 3, No. 1, Feb. 1993.*

Nemhauser, G.L., A Cutting Plane Algorithm for the Single Machine Scheduling Problem with Release Times Combinatorial Optimization, NATO ASI Series, vol. 82, 1992.*

Song, Yang et al., Bottleneck Station Scheduling in Semiconductor Assembly and Test Manufacturing Using Ant Colony Optimization, IEEE Transactions on Automation Science and Engineering, vol. 4, No. 4, Oct. 2007.*

Deng. "Combining Mathematical Programming and Enhanced GRASP Metaheuristics: An 1-20 Application to Semiconductor Manufacturing." Ph.D. Dissertation, University of Texas at Austin [online]. Published Dec. 2009. [retrieved on Dec. 27, 2012] Retrieved from the Internet <URL: http://repositories.lib .utexas.edu/bitstream/handle/2152117309/dengy50033.pdf?sequence=2 > entire document.

Goodlin et al. "Simultaneous Fault Detection and Classification for Semiconductor Manufacturing Tools"; Manuscript submitted Jun. 26, 2002; revised manuscript received May 30, 2003. This was Paper 415 presented at The Electrochemical Society Meeting, Philadelphia, PA, May 12-17, 2002. Available electronically Oct. 23, 2003.

International Search Report and Written Opinion for Application No. PCT/US2012/062859, mailed Jan. 24, 2013.

International Preliminary Report on Patentability for Application No. PCT/US2012/062859, mailed May 6, 2014.

Lu, Yufeng. Scheduling of wafer test processes in semiconductor manufacturing. Diss. Virginia Tech, 1997,173 pages.

* cited by examiner

- Sub-problem 1
  - Stations S1 = {s1, s2}
  - Tasks T1 = {t1 through t6}
- Sub-problem 2
  - Stations S2 = {s3, s4}
  - Tasks T2 = {t7 through t10}
- Exceptions
  - T3 = {t11}

FIG. 5

METHOD AND SYSTEM FOR SPLITTING SCHEDULING PROBLEMS INTO SUB-PROBLEMS

TECHNICAL FIELD

Implementations of the present disclosure relate to scheduling generally, and more particularly, to splitting scheduling problems into sub-problems.

BACKGROUND

A difficulty in addressing a manufacturing scheduling problem can be related to the problem size. Typical manufacturing scheduling problems involve a large number of stations and a significant number of tasks to be performed on the stations. For example, scheduling can depend on a number of tools, a number of lots, a sequential order of operations, constraints, etc. Traditional scheduling systems spend a great amount of time and computing resources in solving a scheduling problem that involves many variables and factors. The difficulty grows very fast as the size of the scheduling problem grows. For this reason, large scheduling problems can be impossible to solve directly.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" implementation in this disclosure are not necessarily to the same implementation, and such references mean at least one.

FIG. 5 illustrates example scheduling sub-problems and an example task exception.

DETAILED DESCRIPTION

Implementations of the disclosure are directed to a method and system for splitting a scheduling problem into scheduling sub-problems. A computing system receives user input of scheduling problem data. The scheduling problem data identifies stations and tasks to be performed by at least one station. The computing system constructs a graph problem using the scheduling problem data. The graph problem can include a graph, which the computing system can partition into sub-graphs using a cut algorithm to create a cut result that satisfies a threshold. Examples of a threshold can include, and are not limited to, creating a cut result that has the fewest task exceptions, creating a cut result that has the fewest number of types of tasks, creating a cut result that has the fewest number of task recipes that are exceptions. The computing system identifies task exceptions from the sub-graphs. A task exception can be a task that can be assigned to more than one sub-graph. The computing system creates scheduling sub-problems using the cut result. Implementations greatly reduce the amount of time and resources used to solve a manufacturing scheduling problem by automatically splitting a large scheduling problem into sub-problems and identifying one or more task exceptions associated with the sub-problems.

Figure 1:
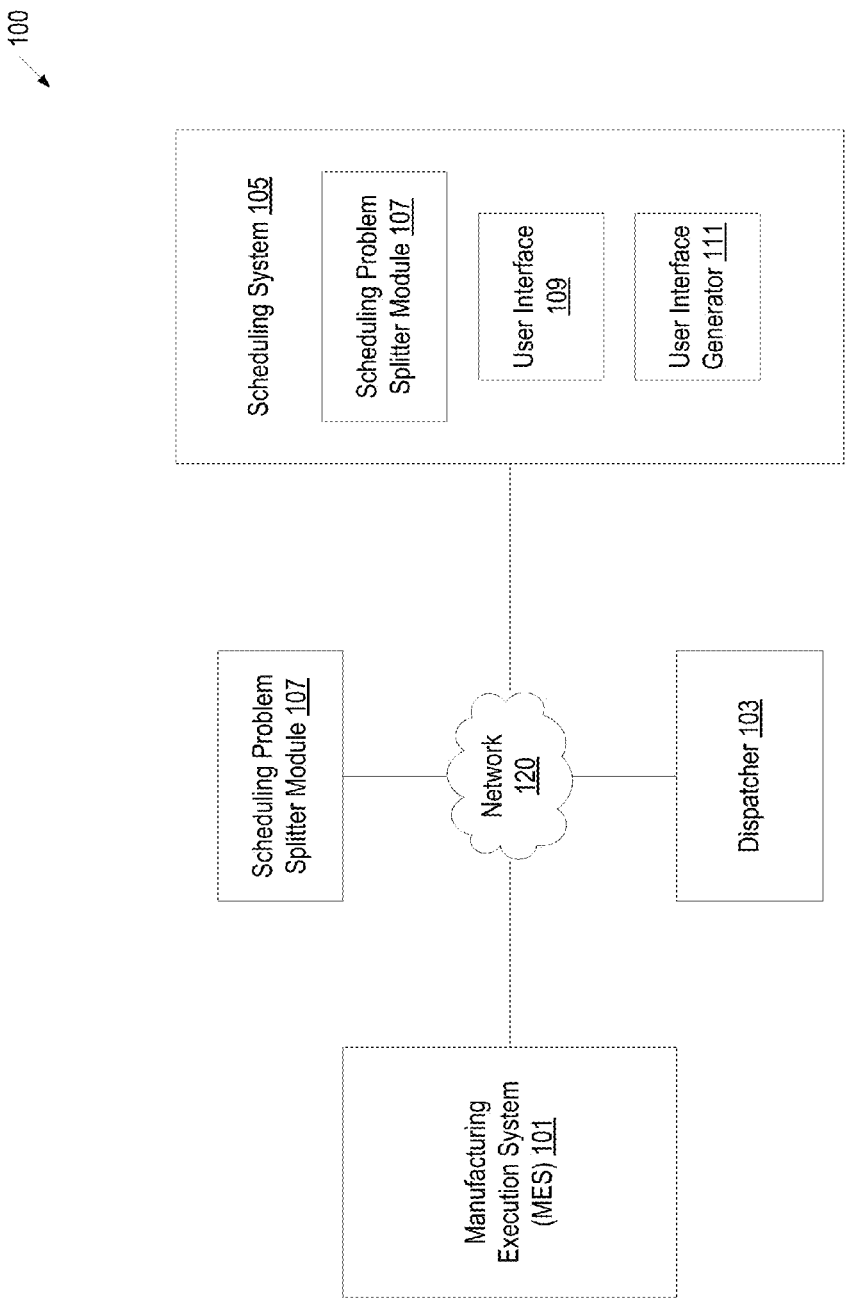
FIG. 1 is a block diagram illustrating a scheduling system utilizing a scheduling problem splitter module.

FIG. 1 is a block diagram illustrating a manufacturing system 100 including a fabrication system data source (e.g., manufacturing execution system (MES) 101), a dispatcher 103, and a scheduling system 105 communicating, for example, via a network. 120. The network 120 can be a local area network (LAN), a wireless network, a mobile communications network, a wide area network (WAN), such as the Internet, or similar communication system.

In one implementation, the scheduling system 105 includes a scheduling problem splitter module 107. In another implementation, the scheduling system 105 communicates with an external scheduling problem splitter module 107, for example, via the network 120. The MES 101, dispatcher 103, scheduling system 105, and scheduling problem splitter module 107 can be individually hosted by any type of computing device including server computers, gateway computers, desktop computers, laptop computers, tablet computer, notebook computer, PDA (personal digital assistant), mobile communications devices, cell phones, smart phones, hand-held computers, or similar computing device. Alternatively, any combination of MES 101, dispatcher 103, scheduling system 105, and scheduling problem splitter module 107 can be hosted on a single computing device including server computers, gateway computers, desktop computers, laptop computers, mobile communications devices, cell phones, smart phones, hand-held computers, or similar computing device.

A scheduling system 105 can receive input relating to a scheduling problem from a scheduling problem splitter module 107 to create a schedule of when one or more tasks can be performed and on which stations (tool). A schedule can be a list of tasks that each station processes. The schedule can include the task start times. Stations can be certified to run certain tasks. A task can be a task used in the manufacturing of semiconductors and there can be different types of tasks. Examples of tasks can include, and are not limited to, a task to manufacture a product, a task to use a reticle manufacturing tool, a task to inspect a reticle manufacturing tool, a task to process a lot of wafers, etc.

The scheduling problem splitter module 107 can identify a scheduling problem and automatically split the scheduling problem into smaller scheduling sub-problems. A scheduling problem can involve a set of tasks T and a set (e.g., set S) of stations, also known as tools. For example, a scheduling problem may involve forty to fifty stations and more than two thousand tasks. Each task can be processed on one or more stations. The scheduling problem splitter module 107 can split a scheduling problem if there exist disjoint subsets of tasks, such as task subset T1 and task subset T2, such that T is the union of task subset T1 and task subset T2, and similar disjoint subsets of stations, such as station subset S1 and station subset S2, such that set S is the union of station subset S1 and station subset S2, and where the tasks in task subset T1 can only process on stations in station subset S1 and tasks in task subset T2 can only process on stations in station subset S2.

The scheduling problem splitter module 107 can automatically convert a manufacturing scheduling problem into a graph theory problem and can apply a cut algorithm to the graph theory problem to solve the problem. The scheduling problem splitter module 107 can convert the solution from the graph theory problem format back into a format for the scheduling problem, where the scheduling problem can be represented by smaller sub-problems and one or more task exceptions associated with the sub-problems. The scheduling problem splitter module 107 can provide data reflecting the smaller scheduling sub-problems to the scheduling system 105, which can use the data to provisionally schedule the times for various tasks to be performed. In one implementation, the scheduling system 105 is coupled to a factory system data source (e.g., MES 101, ERP) to receive lot data and equipment status data and uses the scheduling sub-problem data, lot data, and equipment status data to provisionally schedule tasks to be performed. In one implementation, scheduling system 105 can include a graphical user interface (GUI) generator 111 to create and provide a user interface 109 (e.g., GUI) to a user (e.g., an industrial engineer). User interface 109 can enable a user (e.g., an industrial engineer) to model a provisional schedule. In one implementation, the scheduling system 105 provides the entire schedule to a dispatcher 103. The dispatcher 103 can be integrated through the MES 101 to dispatch, for example, wafer lots accordingly.

Figure 2:
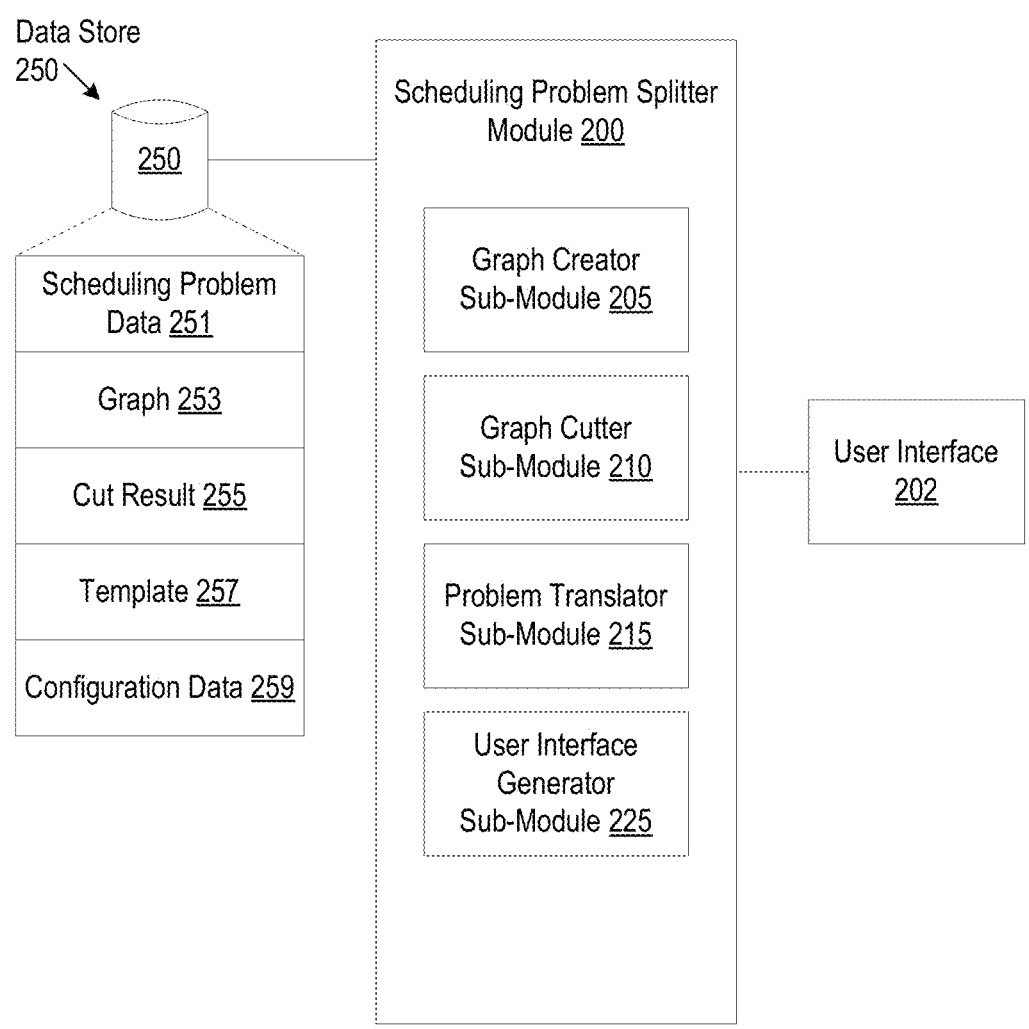
FIG. 2 a block diagram of one implementation of a scheduling problem splitter module.

FIG. 2 is a block diagram of one implementation of a scheduling problem splitter module 200. In one implementation, the scheduling problem splitter module 200 can be the same as the scheduling problem splitter module 107 of FIG. 1. The scheduling problem splitter module 200 can include a graph creator sub-module 205, a graph cutter sub-module 210, a problem translator sub-module 215, and a user interface (UI) generator sub-module 225.

The user interface generator sub-module 225 can generate a user interface 202 that can receive a set of scheduling problem data 251 as user input for a scheduling problem. The scheduling problem splitter module 200 can also receive a set of scheduling problem data 251 or a portion of the scheduling problem data 251 from another system in a manufacturing system. The scheduling problem data 251 can define tasks to be performed (e.g., a set of tasks T) and a set (e.g., set S) of stations or tools for performing the tasks. The scheduling problem data 251 can also describe whether a task can be processed on one or more stations and can identify one or more stations for performing the task. The scheduling problem data 251 can be stored in a data store 250 that is coupled to the scheduling problem splitter module 200. There can be multiple sets of scheduling problem data 251 for multiple scheduling problems stored in the data store 250. The data store 250 can be a persistent storage unit. A persistent storage unit can be a local storage unit or a remote storage unit. Persistent storage units can be a magnetic storage unit, optical storage unit, solid state storage unit, electronic storage unit (main memory) or similar storage unit. Persistent storage units can be a monolithic device or a distributed set of devices. A 'set', as used herein, refers to any positive whole number of items.

The graph creator sub-module 205 can use the scheduling problem data 251 for a particular scheduling problem to convert the scheduling problem format to a graph problem format. The graph creator sub-module 205 can construct a graph problem to represent the scheduling problem. The graph creator sub-module 205 can create a graph 253 for the graph problem. A graph 253 can be stored in a data store 250. There can be graphs 253 for various scheduling problems stored in the data store 250. A graph 253 can be a mathematical structure used to model pair wise relations between objects from a certain collection. A graph 253 can refer to a collection of vertices or nodes and a collection of edges that connect pairs of vertices (nodes). An edge is also hereinafter referred to as a line. A graph 253 can include graph properties, for example, and not limited to, each station (e.g., s1, s2, ... sn) in the set S of stations for the scheduling problem can be a node in the graph, and there can be an edge (line) in the graph 253 connecting the nodes corresponding to a pair of stations to indicate that there is at least one task that can run on the pair of stations.

The scheduling problem data 251 can include one or more weight types and/or weight values, for example, as defined by user input. The graph creator sub-module 205 can assign a weight to each pair of connected stations in a graph 253 indicating, for example, the importance that the stations are connected based on, such as, constraints pertaining to the stations. The graph creator sub-module 205 can assign a weight to a line in a graph 253 based on the scheduling problem data 251. Examples of weight types that can be calculated can include, and are not limited to, the percentage of tasks that can run on both of the connected stations, where the percentage is weighted based on the importance of the task (e.g., task priority, for example, based on user input), the percentage of operations or route steps that can be processed on both of the connected stations, the percentage of operations or route steps that can be processed on both of the connected stations, weighted by the percentage of expected lots for that operation, and a percentage indicating the importance of one task in relation to another (e.g., task 1 should be followed by task 2). Implementations apply both to job shop scheduling, where each task is independent, and to flow shop scheduling, where tasks represent multiple operations for a single manufacturing lot and where the tasks for a lot should be processed in a certain order. The weight value assigned to a line can reflect a flow shop schedule to indicate the importance of adjacent operations (also known as a precedent constraint). The graph creator sub-module 205 can further adjust a weight based on other parameters, such as, and not limited to, physical distance between the stations, physical similarity between the stations, brand or station type.

Figure 3A:
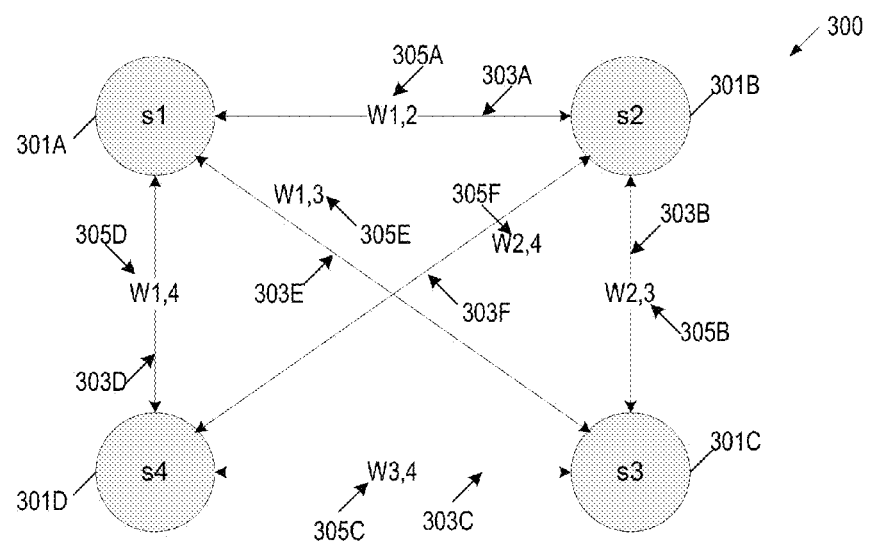
FIGS. 3A-D illustrate example graphs representing a scheduling problem.
Figure 3B:
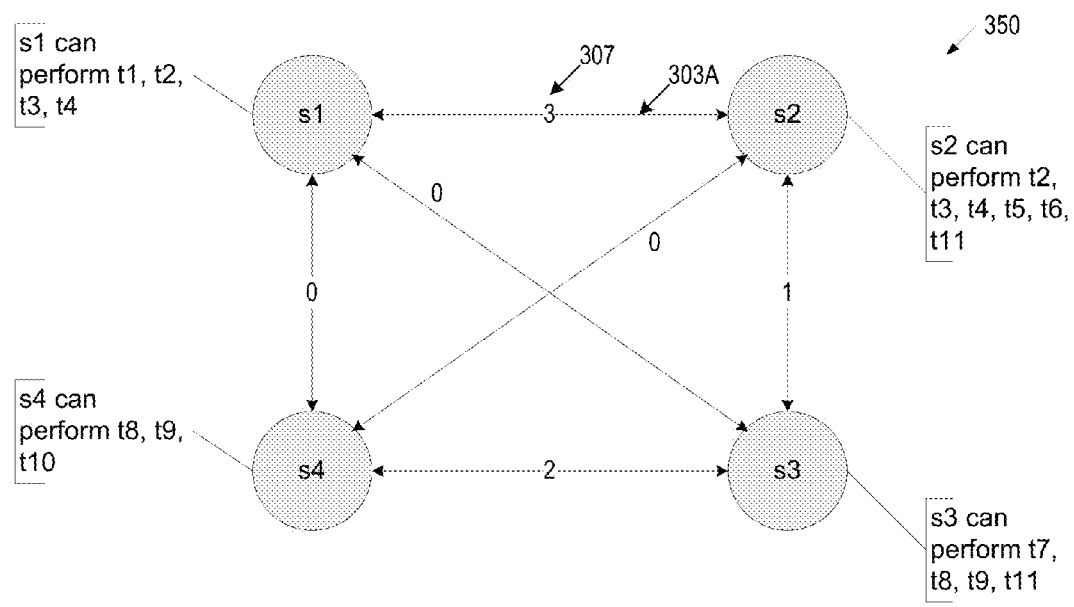

FIG. 3A is an example graph 300 for a scheduling problem. The scheduling problem data for the scheduling problem may include stations s1, s2, s3, and s4, and tasks t1-t11. The graph 300 may include a node (e.g., nodes 301A-D) for each station. The graph 300 may include lines (e.g., lines 303A-F) that connect pairs of nodes indicating there is some task that can run on both stations corresponding to the connected nodes. The lines 303A-F can be assigned based on the scheduling problem data. For example, the scheduling problem data may specify that the task t1 can be processed on station s1; the tasks t2, t3, and t4 can be processed on stations s1 and s2; the tasks t5 and t6 can be processed on station s2; the task t7 can be processed on station s3; the tasks t8 and t9 can be processed on stations s3 and s4; the task t10 can be processed on station s4; the task t11 can be processed on stations s2 and s3. Based on this data, for example, there may be a line 303A in the graph 300 connecting node 301A, which may represent station s1, to node 301B, which may represent station s2, to indicate that there is at least one task (e.g., t2, t3, t4) that may run on both stations s1 and s2. The lines 303A-F can also be assigned weights (e.g., 305A-F). In one implementation, a line weight indicates the number of tasks that can be processed on both of the stations corresponding to the nodes connected by the line. FIG. 3B is an example graph 350 having weights assigned based on the number of tasks that can be processed on both of the stations. For example, a value of '3' may be assigned as the weight 307 to line 303A to indicate that both stations, s1 and s2, can process three tasks (e.g., t2, t3, and t4) as defined by the scheduling problem data. In another implementation, a line weight indicates a flow shop schedule to reflect the importance of adjacent operations.

Figure 3C:
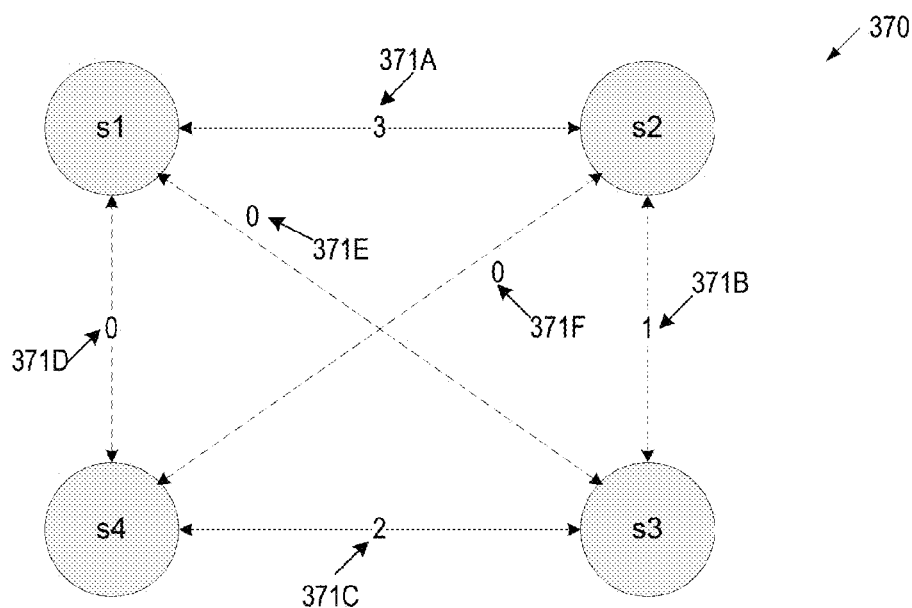
Figure 3D:
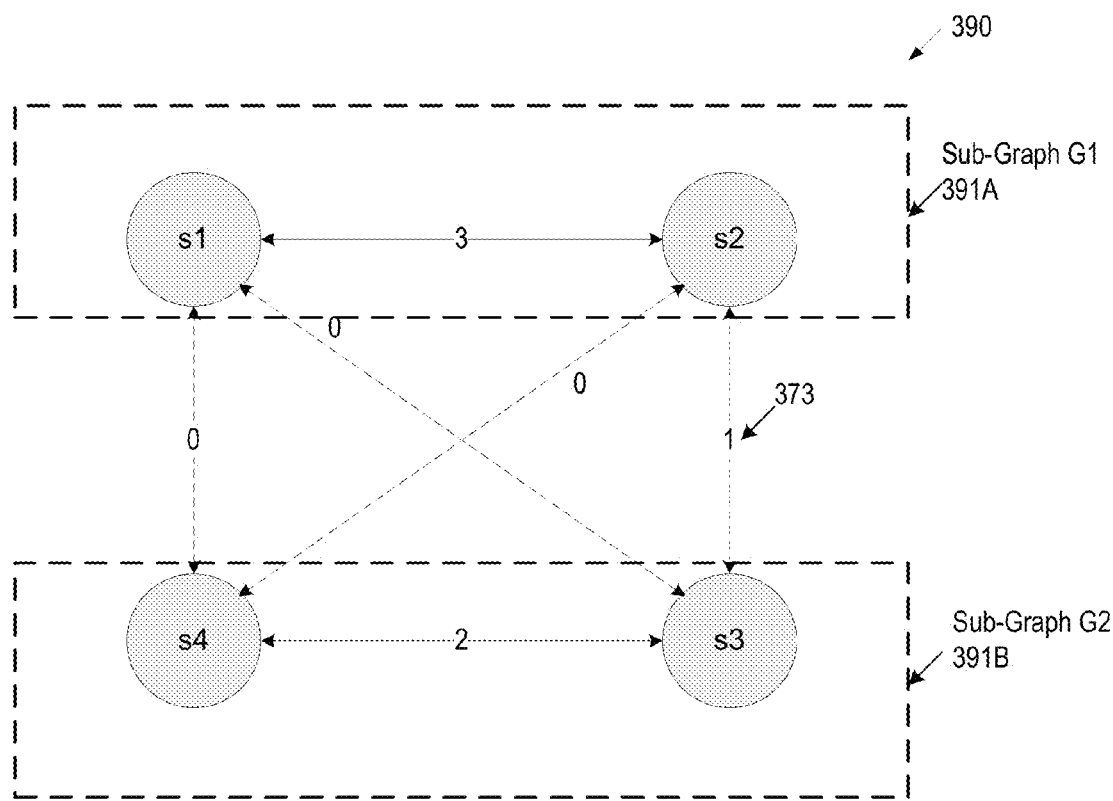

Returning to FIG. 2, the graph cutter sub-module 210 can partition a graph 253 into sub-graphs to split a scheduling problem into scheduling sub-problems to create a cut result 255 that satisfies a threshold. Examples of a threshold can include, and are not limited to, creating a cut result 255 that has the fewest task exceptions, creating a cut result 255 that has the fewest number of types of tasks, creating a cut result 255 that has the fewest number of task recipes that are exceptions. A task exception can be a task that can be performed on stations in more than one sub-graph. For example, a task exception may be a task that can be performed by stations in station subset S1 and stations in station subset S2. The graph cutter sub-module 210 can cut lines of a graph 253 by applying a cut algorithm to create a cut result 255. The cut result 255 can represent sub-graphs of a graph 253, which has been partitioned. The cut result 255 can be stored in the data store 250. A cut can be a partition of the vertices (nodes) of a graph 253 into two disjoint subsets. The size of a cut C=(S,T) can be the number of lines in the cut-set. If the lines are weighted, the value of the cut can be the sum of the weights. In one implementation, the graph cutter sub-module 210 applies a minimal cut algorithm to the graph 253, which is an algorithm that makes a minimum cut to cut the graph 253 into two sub-graphs (e.g., G1 and G2). Various cut algorithms to split a graph into any number of sub-graphs can be used. A cut can be a minimum cut if the cut set for the cut has the smallest number of elements. For example, a cut across three lines may result in six elements (e.g., two elements per line that is cut), and a cut across two lines may result in four elements. The cut across the two lines may be the minimum cut. The graph cutter sub-module 210 can cut lines based on total weight. FIG. 3C is an example graph 370 for a scheduling problem that has lines cut based on total weight of the lines, according to various implementations. The graph 370 may have line weights (e.g., weights 371A-F) based on the number of tasks that can be processed on both of the stations connected by a line. The cut result from cutting the lines based on the total weight may be, for example, two sub-graphs G1 and G2. The graph cutter sub-module can cut the lines that have the smallest total weight. For example, lines 303B,D,E,F may be cut. FIG. 3D is an example graph 390 for a scheduling problem that may be split into sub-graph G1 391A and sub-graph G2 391B after cutting the lines that have the smallest total weight (e.g., line connecting s1 and s4, line connecting s2 and s3, line connecting s1 and s3, line connecting s4 and s2).

For each sub-graph (sub-graph G1 391A and sub-graph G2 391B), the graph cutter sub-module 210 can identify a subset (e.g., S1, S2) of the set of stations (e.g., S), where each station subset has a corresponding subset of tasks (task subset). For example, in FIG. 3D, the graph cutter sub-module 210 may identify that the subset S1 of stations corresponds to sub-graph G1 391A. The station subset S1 may include stations s1 and s2. The graph cutter sub-module 210 can also identify that the subset of stations S2 may correspond to sub-graph G2 391B. The subset station S2 may include stations s3 and s4. The graph cutter sub-module 210 can identify that station subset S1 may have a corresponding task subset T1, and that station subset S2 may have a corresponding task subset T2. The task subset T1 may include tasks t1-t6. The task subset T2 may include tasks t7-t10.

The graph cutter sub-module 210 can also use the sub-graphs in a cut result 255 to identify one or more tasks exceptions. The one or more task exceptions can be grouped to form another task subset (e.g., T3). For example, the graph cutter sub-module 210 may determine that if the graph 390 is split into sub-graph G1 391A and sub-graph G2 391B, then there may be only one task exception. The task exception can be represented by the weight value '1' 373 which may represent task 11 (t11) that can be processed on s2 (station 2) and s3 (station 3). For example, since task t11 can be processed on stations that are in different sub-graphs, task t11 is a task exception.

The problem translator sub-module 215 can identify sub-problems for a scheduling problem using the sub-graphs, station subset for each sub-graph, and task subset for each sub-graph. The problem translator sub-module 215 can convert the sub-graphs into the format of sub-problems, for example, using a template 257 and/or configuration data 259 that is stored in the data store 250. The problem translator sub-module 215 can group a station subset and the task subset that corresponds to the station subset as a sub-problem. For example, station subset S1 and task subset T1 may be grouped to form Sub-Problem 1, and station subset S2 and task subset T2 may be grouped to form Sub-Problem 2. The problem translator sub-module 215 can also identify task exceptions associated with the sub-problems for the scheduling problem. For example, the problem translator sub-module 215 may identify task t11 as a task exception associated with Sub-Problem 1 and Sub-Problem 2. The problem translator sub-module 215 can create another set of tasks (e.g., T3) to represent the one or more task exceptions. The smallest number of task exceptions can be an indication of optimal sub-graphs. For example, sub-graph G1 391A and sub-graph G2 391B may result in one task exception. In this example, the sub-graphs G1 and G2 may indicate the optimal cut of the graph.

Figure 4:
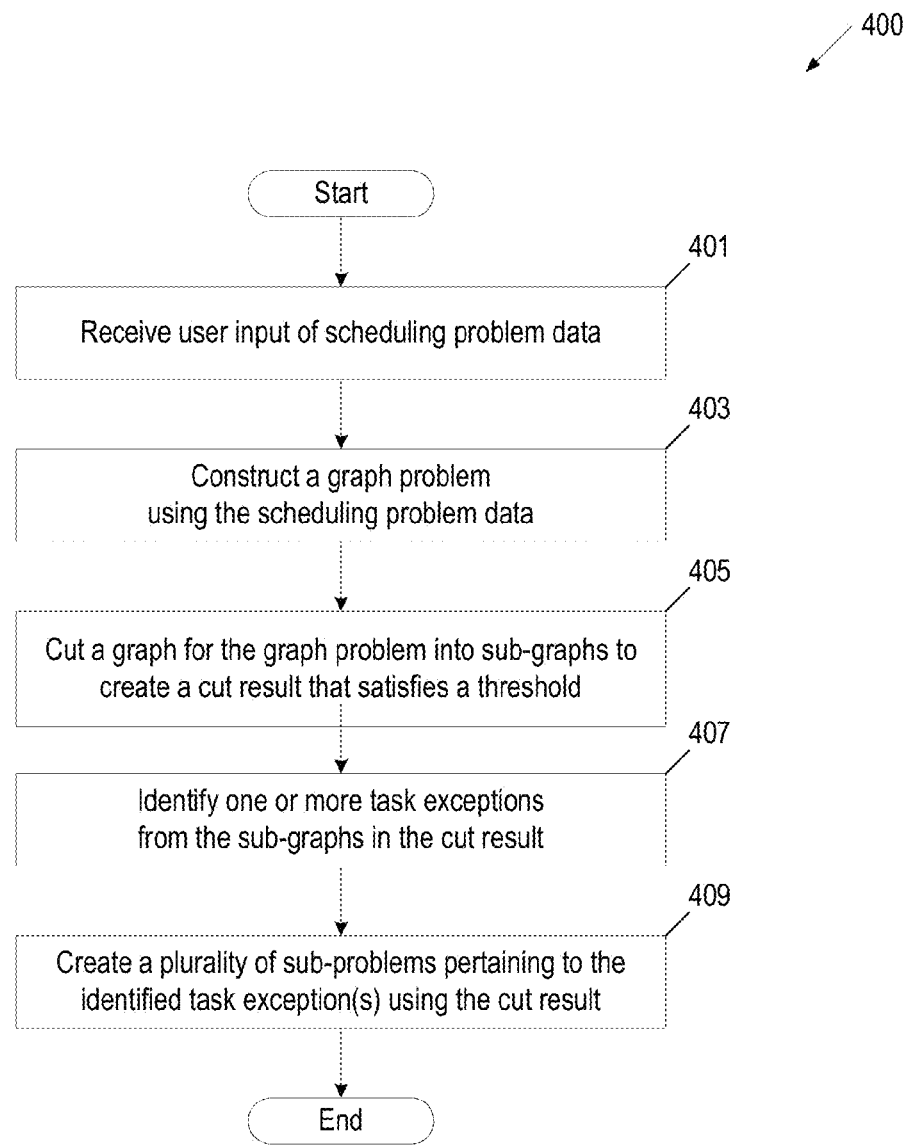
FIG. 4 illustrates one implementation of a method for splitting a scheduling problem into scheduling sub-problems.

FIG. 4 is a flow diagram of an implementation of a method 400 for splitting a scheduling problem into scheduling sub-problems. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by the scheduling problem splitter module 107 hosted by a computing device of FIG. 1.

At block 401, processing logic receives user input of scheduling problem data. The scheduling problem data can include data received from another system in a manufacturing system. The user input for the scheduling problem data can include, for example, and is not limited to, the number stations, station data (e.g., status) describing specific stations, the tasks to be performed (e.g., a set of tasks T), a set (e.g., set S) of stations or tools for performing the tasks, weight type, and weight values. The weight types and weight values can be for stations and/or tasks. The scheduling problem data can also describe whether a task can be processed on one or more stations and can identify which stations can perform the task.

At block 403, processing logic constructs a graph problem using the scheduling problem data. Processing logic can apply the weights, if any, from the user input to construct a weighted graph problem. At block 405, processing logic cuts the graph into sub-graphs by applying a cut algorithm to create a cut result that satisfies a threshold. Examples of a threshold can include and are not limited to, creating a cut result that has the fewest task exceptions, creating a cut result that has the fewest number of types of tasks, creating a cut result that has the fewest number of task recipes that are exceptions. Processing logic selects an optimal split of sub-graphs that satisfies the threshold. The threshold can be a user-defined threshold. Processing logic can apply different edge (line) weights when constructing the graph. The different weights can cause different types of exceptions to be minimized. At block 407, processing logic identifies one or more task exceptions from the sub-graphs in the cut result. At block 409, processing logic creates scheduling sub-problems pertaining to the one or more task exceptions using the cut result. Subsequently, processing logic may provide the sub-problems and task exceptions to a scheduling system. The scheduling system may use a heuristic to automatically assign a task exception to a sub-problem. For example, the heuristic may be based on the bandwidth of the sub-problems. In another example, a user (e.g., process engineer) can be notified, for example, via a scheduling system, of the one or more task exceptions and can assign a task exception to a sub-problem. FIG. 5 illustrates example scheduling sub-problems and an example task exception for the scheduling problem described by the graphs in FIGS. 3A-D. For example, a process engineer may determine that Sub-problem 1 does not have enough work and may assign the task exception task 11 to Sub-problem 1.

Returning to FIG. 4, portions of method 400 can be an iterative method. The number of iterations can be based on a configurable and/or user-defined value. For example, processing logic can perform multiple iterations until, for instance, a minimal number of task exceptions are identified. For example, processing logic may initially split a graph (e.g., graph 350 in FIG. 3B), where Sub-graph 1 may include stations s1 and s4, and Sub-graph 2 may include stations s2 and s3, at block 405. With such a split, processing logic may identify, for example, five task exceptions. For example, tasks t2, t3, and t4 may be run on stations s1 and s2, and tasks t8 and t9 may be run on stations s4 and s1. Subsequently, processing logic may split the graph, where Sub-graph 1 may include stations s1 and s2, and Sub-graph 2 may include stations s4 and s3 at block 405, and identifies, for example, one task exception (e.g., task t11 can be run on stations s2 and s3). Processing logic can compare the number of task exceptions from the various splits and can select the split resulting in the fewest number of task exceptions at block 405. For example, processing logic may select the split, where Sub-graph 1 may include stations s1 and s2, and Sub-graph 2 may include stations s4 and s3, since this particular split results in one task exception.

Figure 6:
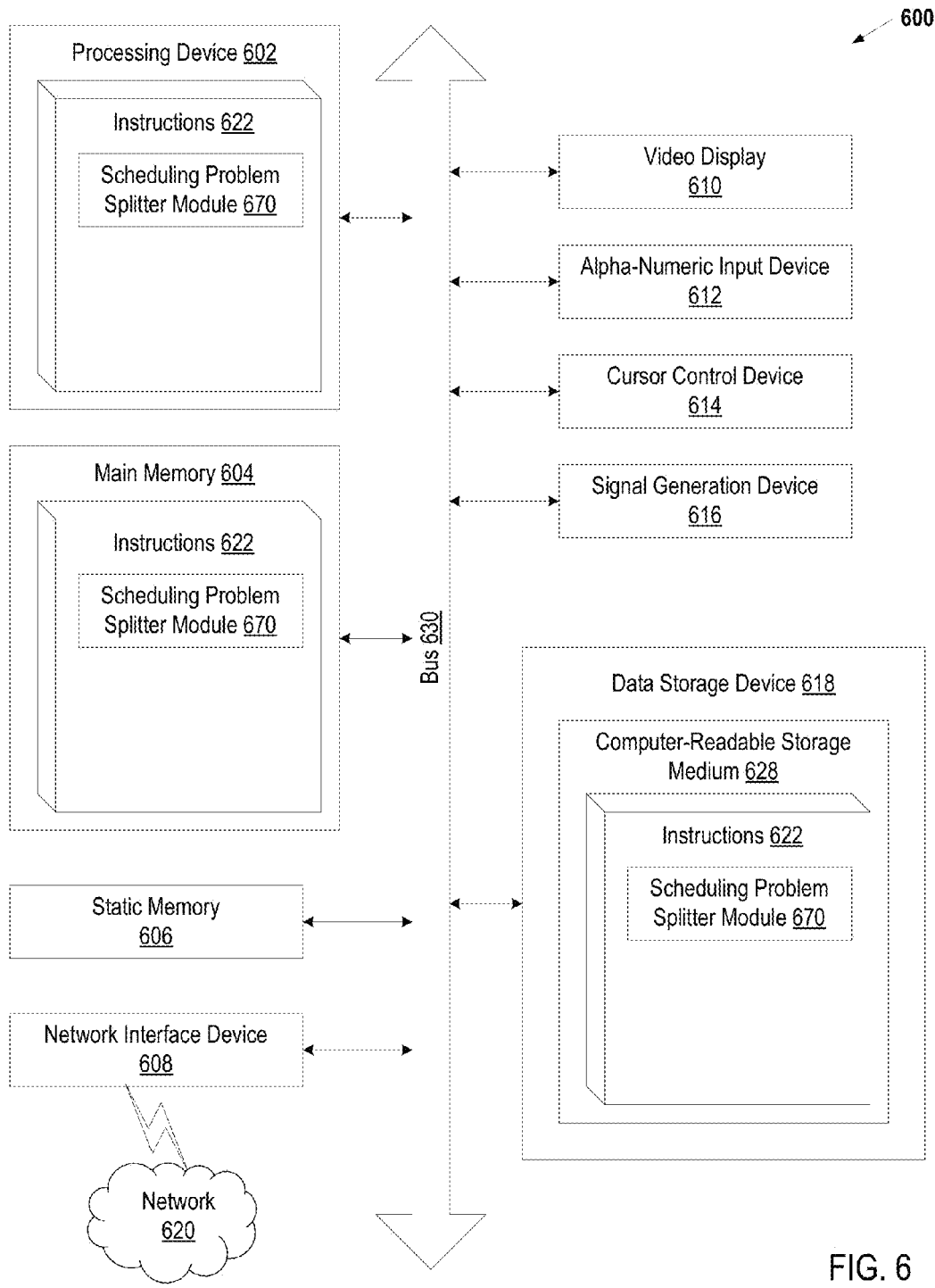
FIG. 6 illustrates an example computer system.

FIG. 6 is a block diagram illustrating an example computing device 600. In one implementation, the computing device corresponds to a computing device hosting a scheduling problem splitter module 107 of FIG. 1. The computing device 600 includes a set of instructions for causing the machine to perform any one or more of the methodologies discussed herein. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions 622 (sequential or otherwise) that specify actions to be taken by that machine. Further, while only a single machine is illustrated, the term "machine" shall also be taken to include any collection of machines that individually or jointly execute a set (or multiple sets) of instructions 622 to perform any one or more of the methodologies discussed herein.

The exemplary computer device 600 includes a processing system (processing device) 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the scheduling problem splitter module 670 for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 on which is stored one or more sets of instructions 622 (e.g., instructions of scheduling problem splitter module 670) embodying any one or more of the methodologies or functions described herein. The scheduling problem splitter module 670 may also reside, completely or at least partially, within the main memory 604 and/or within the processing device 602 during execution thereof by the computing device 600, the main memory 604 and the processing device 602 also constituting computer-readable media. The scheduling problem splitter module 670 may further be transmitted or received over a network 620 via the network interface device 608.

While the computer-readable storage medium 628 is shown in an example implementation to be a single medium, the term "computer-readable storage medium" should be taken to include a single medium or multiple media (e.g., a centralized or distributed database, and/or associated caches and servers) that store the one or more sets of instructions 622. The term "computer-readable storage medium" shall also be taken to include any medium that is capable of storing, encoding or carrying a set of instructions 622 for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "constructing," "cutting," "identifying," "creating," "assigning," "sending," or the like, refer to the actions and processes of a computing device, or similar electronic computing device, that manipulates and transforms data represented as physical (e.g., electronic) quantities within the computer system's registers and memories into other data similarly represented as physical quantities within the computer system memories or registers or other such information storage devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, user input of first scheduling data in a first format to schedule a plurality of tasks to be performed by a plurality of stations of a manufacturing system, the first scheduling data comprising the plurality of stations, the plurality of tasks, information indicating, for each of the plurality of tasks, one or more corresponding stations of the plurality of stations that is capable of performing a corresponding task of the plurality of tasks, and a number of a plurality of combinations of tasks and stations, wherein a scheduling system of the manufacturing system is unable to process the number of the plurality of combinations in the first format;
   creating, by the processing device, second scheduling data in a second format, the second format comprising a graph and a plurality of nodes in the graph to represent the plurality of stations;
   determining, by the processing device, one or more pairs of nodes of the plurality of nodes in the graph having at least one respective task of the plurality of tasks that is common to nodes in respective pairs of nodes;
   creating, by the processing device, node connectors in the graph to represent the one or more pairs of nodes of the plurality of nodes having the at least one respective task of the plurality of tasks that is common to the nodes in the respective pairs of nodes;
   applying, by the processing device, a weight to one or more node connectors in the graph based on the at least one respective task of the plurality of tasks that is common to the nodes in the respective pairs of nodes;
   creating, by the processing device, a plurality of partitions of the graph based on the weight applied to the one or more node connectors in the graph;
   determining, by the processing device, from the plurality of partitions of the graph, one or more task exceptions that are associated with a respective partition, wherein the one or more task exceptions are tasks that are eligible to be processed by stations that are represented by nodes in different partitions;
   for each of the plurality of partitions, grouping, by the processing device, a subset of stations in the respective partition with a corresponding task subset;
   creating, by the processing device, a new task set comprising the one or more task exceptions;
   creating, by the processing device, a plurality of new representations of the plurality of partitions in a third format that is compatible with the scheduling system, the plurality of new representations reducing the number of the plurality of combinations of tasks and stations based on the grouping; and
   initiating, by the processing device, the scheduling system to generate a schedule for performing, by the one or more stations, the plurality of tasks based on the plurality of new representations in the third format that is compatible with the scheduling system and the new task set comprising the one or more task exceptions, wherein the manufacturing system is to perform the plurality of tasks based on the schedule.

2. The method of claim 1, wherein creating the plurality of partitions of the graph comprises:
   partitioning the graph to have a fewest number of tasks eligible to be processed by stations that are represented by nodes in different partitions, a fewest number of types of tasks, or a fewest number of task recipes comprising tasks eligible to be processed by stations that are represented by nodes in different partitions.

3. The method of claim 1, wherein the node connectors comprise lines connecting one or more pairs of the plurality of nodes to represent tasks relating to the stations corresponding to the connected nodes.

4. The method of claim 1, wherein the weight indicates at least one of a number of tasks associated with the stations corresponding to the pair of nodes, a percentage of tasks associated with the stations corresponding to the pair of nodes, or a task priority.

5. The method of claim 1, wherein the plurality of tasks are processed in a specified flow order.

6. The method of claim 1, wherein the plurality of tasks relate to manufacturing semiconductors.

7. A non-transitory computer readable storage medium including instructions that, when executed by a processing device, cause the processing device to perform operations comprising:

receiving user input of first scheduling data in a first format to schedule a plurality of tasks to be performed by a plurality of stations of a manufacturing system, the first scheduling data comprising the plurality of stations, the plurality of tasks, information indicating, for each of the plurality of tasks, one or more corresponding stations of the plurality of stations that is capable of performing a corresponding task of the plurality of tasks, and a number of a plurality of combinations of tasks and stations, wherein a scheduling system of the manufacturing system is unable to process the plurality of combinations in the first format;

creating second scheduling data in a second format, the second format comprising a graph and a plurality of nodes in the graph to represent the plurality of stations;

determining one or more pairs of nodes of the plurality of nodes in the graph having at least one respective task of the plurality of tasks that is common to nodes in respective pairs of nodes;

creating node connectors in the graph to represent the one or more pairs of nodes of the plurality of nodes having the at least one respective task of the plurality of tasks that is common to the nodes in the respective pairs of nodes;

applying a weight to one or more node connectors in the graph based on the at least one respective task of the plurality of tasks that is common to the nodes in the respective pairs of nodes;

creating, by the processing device, a plurality of partitions of the graph based on the weight applied to the one or more node connectors in the graph;

determining, by the processing device, from the plurality of partitions of the graph, one or more task exceptions that are associated with a respective partition, wherein the one or more task exceptions are tasks that are eligible to be processed by stations that are represented by nodes in different partitions;

for each of the plurality of partitions, grouping, by the processing device, a subset of stations in the respective partition with a corresponding task subset;

creating, by the processing device, a new task set comprising the one or more task exceptions;

creating, by the processing device, a plurality of new representations of the plurality of partitions in a third format that is compatible with the scheduling system, the plurality of new representations reducing the number of the plurality of combinations of tasks and stations based on the grouping; and initiating, by the processing device, the scheduling system to generate a schedule for performing, by the one or more stations, the plurality of tasks based on the plurality of new representations in the third format that is compatible with the scheduling system and the new task set comprising the one or more task exceptions, wherein the manufacturing system is to perform the plurality of tasks based on the schedule.

8. The non-transitory computer readable storage medium of claim 7, wherein creating the plurality of partitions of the graph comprises:

partitioning the graph to have a fewest number of tasks eligible to be processed by stations that are represented by nodes in different partitions, fewest number of types of tasks, or a fewest number of task recipes comprising tasks eligible to be processed by stations that are represented by nodes in different partitions.

9. The non-transitory computer readable storage medium of claim 7, wherein the node connectors comprise one or more lines connecting one or more pairs of the plurality of nodes to represent tasks relating to the stations corresponding to the connected nodes.

10. The non-transitory computer readable storage medium of claim 7, wherein the weight indicates at least one of a number of tasks associated with the stations corresponding to the pair of nodes, a percentage of tasks associated with the stations corresponding to the pair of nodes, or a task priority.

11. The non-transitory computer readable storage medium of claim 7, wherein the plurality of tasks relate to manufacturing semiconductors.

12. A system comprising:
a memory; and
a processing device coupled with the memory to:
receive user input of first scheduling data in a first format to schedule a plurality of tasks to be performed by a plurality of stations of a manufacturing system, the first scheduling data comprising the plurality of stations, the plurality of tasks, information indicating, for each of the plurality of tasks, one or more corresponding stations of the plurality of stations that is capable of performing a corresponding task of the plurality of tasks, and a number of a plurality of combinations of tasks and stations, wherein a scheduling system of the manufacturing system is unable to process the plurality of combinations in the first format;

create second scheduling data in a second format, the second format comprising a graph and a plurality of nodes in the graph to represent the plurality of stations;

determine one or more pairs of nodes of the plurality of nodes in the graph having at least one respective task of the plurality of tasks that is common to nodes in respective pairs of nodes;

create node connectors in the graph to represent the one or more pairs of nodes of the plurality of nodes having the at least one respective task of the plurality of tasks that is common to the nodes in the respective pairs of nodes;

apply a weight to one or more node connectors in the graph based on the at least one respective task of the plurality of tasks that is common to the nodes in the respective pairs of nodes;

create a plurality of partitions of the graph based on the weight applied to the one or more node connectors in the graph;

determine, from the plurality of partitions of the graph, one or more task exceptions that are associated with a respective partition, wherein the one or more task exceptions are tasks that are eligible to be processed by stations that are represented by nodes in different partitions; and for each of the plurality of partitions, group a subset of stations in the respective partition with a corresponding task subset;

create a new task set comprising the one or more task exceptions;

create a plurality of new representations of the plurality of partitions in a third format that is compatible with the scheduling system, the plurality of new representations reducing the number of the plurality of combinations of tasks and stations based on the grouping; and initiate the scheduling system to generate a schedule for performing, by the one or more stations, the plurality of tasks based on the plurality of new representations in the third format that is compatible with the scheduling system and the new task set comprising the one or more task exceptions, wherein the manufacturing system is to perform the plurality of tasks based on the schedule.

13. The system of claim 12, wherein to create the plurality of partitions of the graph, the processing device is to:
partition the graph to have a fewest number of tasks eligible to be processed by stations that are represented by nodes in different partitions, a fewest number of types of tasks, or a fewest number of task recipes comprising tasks eligible to be processed by stations that are represented by nodes in different partitions.

14. The system of claim 12, wherein the node connectors comprise lines connecting one or more pairs of the plurality of nodes to represent tasks relating to the stations corresponding to the connected nodes.

15. The system of claim 12, wherein the weight indicates at least one of a number of tasks associated with the stations corresponding to the pair of nodes, a percentage of tasks associated with the stations corresponding to the pair of nodes, or a task priority.

16. The system of claim 12, wherein the plurality of tasks are processed in a specified flow order.

17. The system of claim 12, wherein the plurality of tasks relate to manufacturing semiconductors.

* * * * *